(12) United States Patent
Bain et al.

(10) Patent No.: US 9,773,216 B2
(45) Date of Patent: Sep. 26, 2017

(54) WORKFLOW SHARING

(71) Applicant: Atlassian Pty Ltd, Sydney, OT, NSW (AU)

(72) Inventors: Brenden Jeffery Bain, Sydney (AU); Joshua James Devenny, San Francisco, CA (US); Jonathan Doklovic, Round Rock, TX (US); Paul Slade, Sydney (AU)

(73) Assignee: ATLASSIAN PTY LTD, Sydney (AU)

( * ) Notice: Subject to any disclaimer, the term of this patent is extended or adjusted under 35 U.S.C. 154(b) by 130 days.

(21) Appl. No.: 14/014,307

(22) Filed: Aug. 29, 2013

(65) Prior Publication Data

US 2014/0236843 A1 Aug. 21, 2014

Related U.S. Application Data

(60) Provisional application No. 61/767,682, filed on Feb. 21, 2013.

(51) Int. Cl.
| | |
|---|---|
| *G06Q 10/00* | (2012.01) |
| *G06Q 10/06* | (2012.01) |
| *G06Q 10/10* | (2012.01) |
| *G06Q 30/00* | (2012.01) |

(52) U.S. Cl.
CPC ......... *G06Q 10/063* (2013.01); *G06Q 10/103* (2013.01); *G06Q 30/01* (2013.01)

(58) Field of Classification Search
CPC .. G06Q 40/00; G06Q 10/063; G06Q 10/0631; G06Q 10/06311; G06Q 10/063112; G06Q 10/063114; G06Q 10/1097; G06Q 10/06316; G06Q 10/0633; G06Q 10/103
USPC .......... 705/7.11, 7.12, 7.13, 7.14, 7.15, 7.21, 705/7.26, 7.27, 301
See application file for complete search history.

(56) References Cited

U.S. PATENT DOCUMENTS

| | | | | |
|---|---|---|---|---|
| 5,530,861 | A  * | 6/1996 | Diamant et al. | 705/7.21 |
| 5,999,911 | A  * | 12/1999 | Berg et al. | 705/7.26 |
| 6,101,481 | A  * | 8/2000 | Miller | 705/7.13 |
| 8,639,552 | B1 * | 1/2014 | Chen et al. | 705/7.21 |
| 2004/0068728 | A1* | 4/2004 | Blevins | 718/100 |
| 2006/0069599 | A1* | 3/2006 | Hatoun et al. | 705/8 |
| 2006/0167737 | A1* | 7/2006 | Muller et al. | 705/9 |
| 2006/0236301 | A1* | 10/2006 | Minium et al. | 717/101 |
| 2007/0067196 | A1* | 3/2007 | Usui | 705/8 |
| 2007/0282658 | A1* | 12/2007 | Brintle | 705/9 |
| 2009/0049108 | A1* | 2/2009 | Forde et al. | 707/203 |
| 2011/0264593 | A1* | 10/2011 | Gaisford et al. | 705/301 |
| 2012/0233555 | A1* | 9/2012 | Psistakis et al. | 715/751 |
| 2012/0278117 | A1* | 11/2012 | Nguyen et al. | 705/7.15 |
| 2013/0006689 | A1* | 1/2013 | Kinnear et al. | 705/7.16 |
| 2013/0061155 | A1* | 3/2013 | Hon | 715/753 |

* cited by examiner

*Primary Examiner* — Lalita M Hamilton
(74) *Attorney, Agent, or Firm* — Hickman Palermo Becker Bingham LLP

(57) ABSTRACT

Individuals are provided with a mechanism for sharing their team's workflow with other teams in their organization on different instances in an enterprise or network, or with external parties in other organizations via a workflow marketplace. In this way, individuals can easily use workflows that other people have published, or move a workflow from staging to production in their own organization.

16 Claims, 11 Drawing Sheets

FIGURE 7

Map Workflow Statuses

Map statuses in the workflow to new or existing statuses in JIRA.

| Original Status | | New Status |
|---|---|---|
| Closed (6) | → | Closed (6) |
| Final Review (10030) | → | New Status: Final Review |
| In Development (10029) | → | New Status: In Development |
| Not Started (10004) | → | New Status: Not Started |
| On Hold (10006) | → | New Status: On Hold |
| Open (1) | → | Open (1) |
| Resolved (5) | → | Resolved (5) |
| Team Review (10008) | → | New Status: Team Review |
| Work In Progress (10005) | → | New Status: Work In Progress |

[Back] [Next] Cancel

FIGURE 8

Preview of import

Statuses

The following statuses will be created in your instance of JIRA.

- Final Review
- In Development
- Not Started
- On Hold
- Team Review
- Work In Progress

Screens

The following screens will be created in your instance of JIRA.

| Name | Description |
|---|---|
| Design Screen | |

Custom Fields

The following custom fields will be created in your instance of JIRA.

| Name | Type | Description |
|---|---|---|
| "b" test1111112222222222233 "b" | Cascading Select | Choose multiple values using two select lists. |
| Approved | Multi Checkboxes | Choose multiple values using checkboxes. |
| Cascading Select | Cascading Select | Choose multiple values using two select lists. |
| CI Date | Date Picker | A custom field that stores dates and uses a date picker to view them |
| Expected Date | Date Picker | A custom field that stores dates and uses a date picker to view them |
| Free text custom field | Free Text Field (unlimited text) | A multiline text area custom field to |

FIGURE 9

WORKFLOW SHARING

CROSS REFERENCE TO RELATED APPLICATIONS

This application claims priority to U.S. provisional patent application Ser. No. 61/767,682, filed Feb. 21, 2013, which application is incorporated herein in its entirety by this reference thereto.

BACKGROUND OF THE INVENTION

Technical Field

The invention relates to sharing workflows across instances in a project tracking environment. More particularly, the invention relates to a mechanism that allows individuals to share their team's workflow with other teams in their organization on different instances in an enterprise or network, or with external parties in other organizations via a workflow marketplace.

Description of the Background Art

There are different types of workflows, e.g. production workflows use predefined sequences to guide and control processes whereas, in an ad-hoc workflow, the user determines the process sequence on the fly. Workflows can be implemented as workflow solutions with which users interact, or as workflow engines, which act as a background service controlling the information and data flow.

Workflow management includes the following functions:

Visualization of process and organization structures;

Capture, administration, visualization, and delivery of grouped information with its associated documents or data;

Incorporation of data processing tools, such as specific applications, and documents, such as office products;

Parallel and sequential processing of procedures including simultaneous saving;

Reminders, deadlines, delegation, and other administration functionalities; and

Monitoring and documentation of process status, routing, and outcomes.

A workflow consists of a sequence of concatenated, i.e. connected, steps. Emphasis is on the flow paradigm, where each step follows the precedent without delay or gap and ends just before the subsequent step may begin. This concept is related to non-overlapping tasks of single resources. A workflow can be thought of as a sequence of operations, declared as work of a person, a group of persons, an organization of staff, or one or more simple or complex mechanisms. Workflows may be seen as any abstraction of real work. For control purposes, workflows may be a view on real work under a chosen aspect, thus serving as a virtual representation of actual work. The flow being described may refer to a document or product that is being transferred from one step to another.

Workflow concepts are closely related to other concepts used to describe organizational structure, such as silos, functions, teams, projects, policies, and hierarchies. Workflows may be viewed as one primitive building block of organizations.

A workflow management system is a computer system that manages and defines a series of tasks within an organization to produce a final outcome or outcomes. Workflow management systems allow the user to define different workflows for different types of jobs or processes. For example, in a manufacturing setting, a design document might be automatically routed from designer to a technical director to the production engineer. At each stage in the workflow, one individual or group is responsible for a specific task. Once the task is complete, the workflow software ensures that the individuals responsible for the next task are notified and receive the data they need to execute their stage of the process. Workflow management systems also automate redundant tasks and ensure that uncompleted tasks are followed up.

Workflow management systems may control automated processes in addition to replacing paper work order transfers. For example, if the above design documents are now available as Autocad, but the workflow requires them as Catia, then an automated process would implement the conversion prior to notifying the individual responsible for the next task. This is the concept of dependencies. A workflow management system reflects the dependencies required for the completion of each task.

SUMMARY OF THE INVENTION

While there are thousands of applications that let one define workflows, the ability to take a relatively complex, deeply integrated workflow from one instance in an enterprise or network to another instance is not known. Embodiments of the invention allow individuals to share their team's workflow with other teams in their organization on different instances in an enterprise or network, or with external parties in other organizations via a workflow marketplace. The invention allows individuals to easily use workflows that other people have published, or to move a workflow from staging to production in their own organization.

BRIEF DESCRIPTION OF THE DRAWINGS

FIG. 7 is a screen shot that shows selecting a workflow to upload from a marketplace according to the invention;

FIG. 8 is a screen shot that shows a map of workflow statuses according to the invention;

FIG. 9 is a screen shot that shows a preview of an import according to the invention;

DETAILED DESCRIPTION OF THE INVENTION

A project management system has a capacity to help plan, organize, and manage resource pools and develop resource estimates. Today, numerous PC-based project management software packages exist, and they are finding their way into almost every type of business. In the early days, however, project management software ran on big mainframe computers and was used only in the large projects. These early system were limited in their capabilities and, by today's standards, were hard to use.

Figure 1:
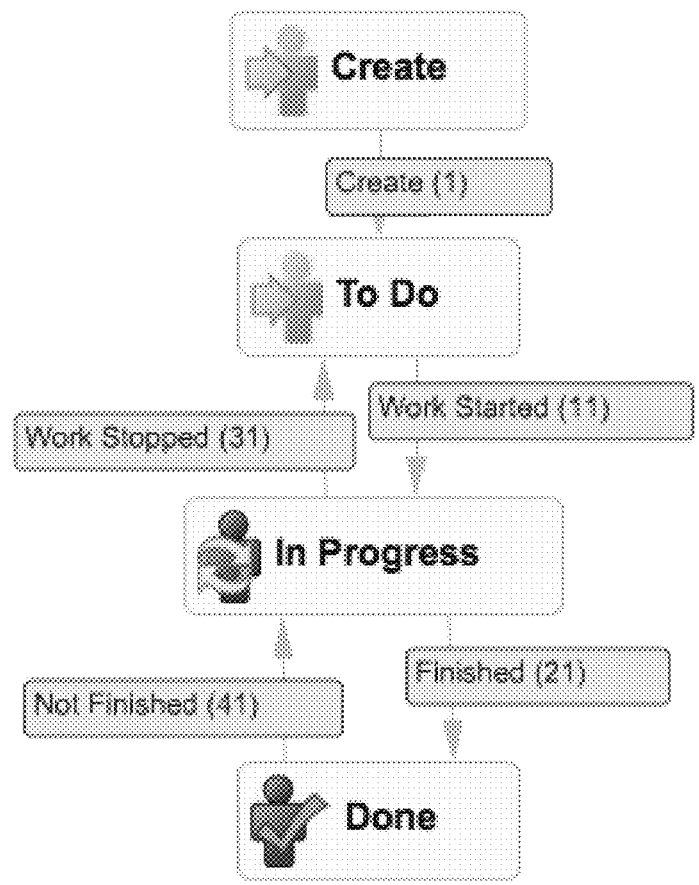
FIG. 1 is a flow diagram showing a generic task management workflow.

FIG. 1 is a flow diagram showing a generic task management workflow. Workflows are a key part of a project tracking environment, such as provided by the JIRA product offered by Atlassian, which is a proprietary system that is used for bug tracking, issue tracking, and project management. A bug tracking system or defect tracking system is a software application that is designed to help keep track of reported software bugs in software development efforts. It may be regarded as a type of issue tracking system. While there are many known implementations of project tracking systems, JIRA is written in Java and uses the Pico inversion of control container, Apache OFBiz entity engine, and WebWork 1 technology stack; for Remote Procedure Calls (RPC), JIRA supports SOAP, XML-RPC, and REST.

Configuring a workflow is not easy. Embodiments of the invention provide the ability within, for example a project tracking environment, to configure a project, instead of having to hand-build a workflow. An embodiment of the invention provides a marketplace in which individuals can find prebuilt workflows and install them into an instance as if they were their own. For example, a company may have a particular approach for handling tickets for an internal service desk. The company may want to look at other workflows that are used at other service desks, they may want to follow a standard pattern for a particular process, or they may want an approvals workflow for a particular application, e.g. travel. An embodiment of the invention provides a view into all available workflows that are stored in the marketplace. An individual at a company can download one of these workflows and begin to use it in their project. In embodiments of the invention, a user could change the workflow, morph it, and edit it as they would with a typical workflow that they independently developed. In an embodiment of the invention, such workflows can depend on a set of plugins that provide special conditions, validators, post functions, and other plugins that are required.

EXAMPLES

Table 1 below provides two use cases in which embodiments of the invention are used in connection with workflow sharing.

TABLE 1

Use Cases - Workflow Sharing

| Story | Acceptance Criteria |
|---|---|
| As Percy, I want to be able to browse workflows on Marketplace and download ones that I need | Percy is given a liot of workflows from Marketplace, sorted by popularity Percy can access this list from global administration - the "View Workflows" page. Percy is taken through a process that notifies him of: The acreena that will be added The fields that will be added The plugins that will be added Has a chance to choose the status mappings of his new workflow (use existing va create new) |

TABLE 1-continued

Use Cases - Workflow Sharing

| Story | Acceptance Criteria |
|---|---|
| As Bridget, I want to browse workflows and choose ones that I can add to my project | Bridget is given the choice to 'Add Existing Workflow' or 'Add from Marketplace' A wizard will be presented (similar to the 'Add Existing Workflow' wizard) that alows 1. Bridget to browse through the different workflows on Marketplace that are available and choose one 2. Gives Bridget a summary of the changes that will happen to her system (if any). Clicks confirm 3. Status bar showing Bridget the download/install process (do we need this?). Clicks next 4. Gets the standard 'Assign issue types' dialog. Chooses issue types and clicks finish. Workflow is added to her project The dialog accepts all of the default status mappings, and gives her a one page summary of the changes |

A project tracking environment includes such elements as a permissioning system, a notification system, a field system, and a workflow system. A project comprises a configuration for each of these elements. A project can have various aspects, for example, bugs, stories, and features. In such case, there is typically a different workflow for each one of these aspects.

Typical project tracking systems include a default workflow, but users of such systems can build a workflow or a third party can provide a workflow which could be plugged into the tracking system. This later case is not trivial. By analogy, it is a lot like transplanting a big seed from one pot to the other, which is trivial vs. transplanting a cedar tree or an oak tree, which is much more difficult. The later case requires careful extraction and careful planting. In a workflow, what may be needed is usually significantly more complex than what is seen on the surface because, for example, workflows often involve calculations that have to do with fields. Thus, it may be necessary to migrate fields from the source of the workflow that are not at the target.

Workflows involve specific logic that may be supplied by a plugin. In the example of transplanting a tree, it may be necessary to consider much more, e.g. the tree's roots which are entangled with a maze of city plumbing, than was ever expected if one is to be able to transplant the tree. Likewise, in the invention one of the most complex parts of workflow sharing is the fact that a workflow that is downloaded from the marketplace must encapsulate all of the underlying complexity of its source instance. Plugging in a workflow means that both the 'roots' have to go in their proper place and that the 'tree' must be shaped properly. This is because there are some parts of the workflow that come with the workflow bundle from the source instance, but that are not wanted or cannot be used at the target instance, or for which there are other elements that already in the system. For example, there are parts of a workflow, such as statuses, that describe the various steps in the workflow. In some project tracking systems those statuses are global, and it is important to be careful about how many of them are created. For example, one organization may use "ready, set and go" as the terminology for their statuses, but a shared workflow may use "open, in progress and done." Thus, there is a complication in sharing a workflow that is "open, in progress and done" in a project tracking system in which 'open' is 'ready,' in progress' is 'set,' and 'done' is 'go.' Accordingly, embodiments of the invention provide not only an interface from one environment or instance to the other, where superficial functions plug together, but must also provide a deep functionality, for example with regard to variables that are passed back and forth.

On the export side of a workflow sharing system there must be an analysis of dependencies. By analogy, again, if you just cut the tree off at the trunk, it is hard to transplant it and expect it to thrive. Accordingly, a key part of the invention involves a determination of what the 'roots' are and then hooking up those 'roots.' This is similar to a local-to-remote copy, where it is necessary to understand the target system and what the user might want to map onto, and then present the workflow in a logical fashion to the user so that the user can add the workflow to, for example, the project tracking system. Thus, mapping a workflow to a populated existing project tracking system is not trivial. While one approach might be to simply rewrite or reconfigure the workflow, this defeats the purpose of workflow sharing. For example, when moving from one step in a workflow to the next, the user may be required to give a reason for such movement in the workflow, e.g. the reason a request was rejected. In project tracking systems, that reason and the ability to capture that reason comprises a field system, where workflows are naturally tied to fields. Such field system is integral to project tracking systems.

Figure 2:
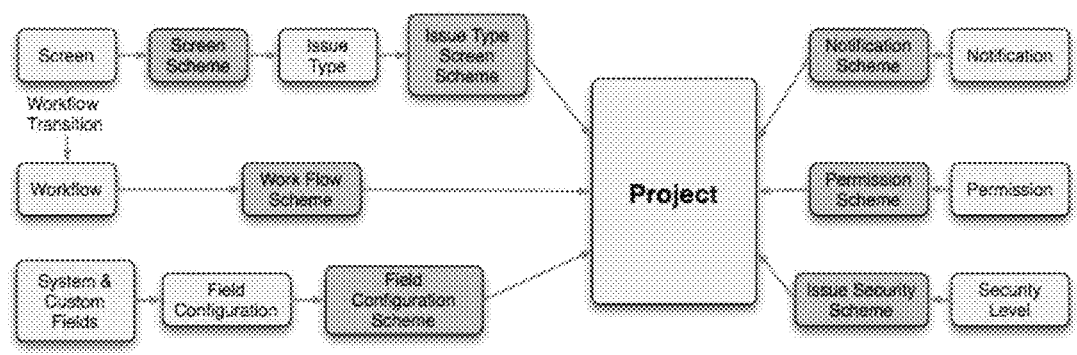
FIG. 2 is a block schematic diagram that shows the relationships between various entities and schemes within a workflow.
Figure 3:
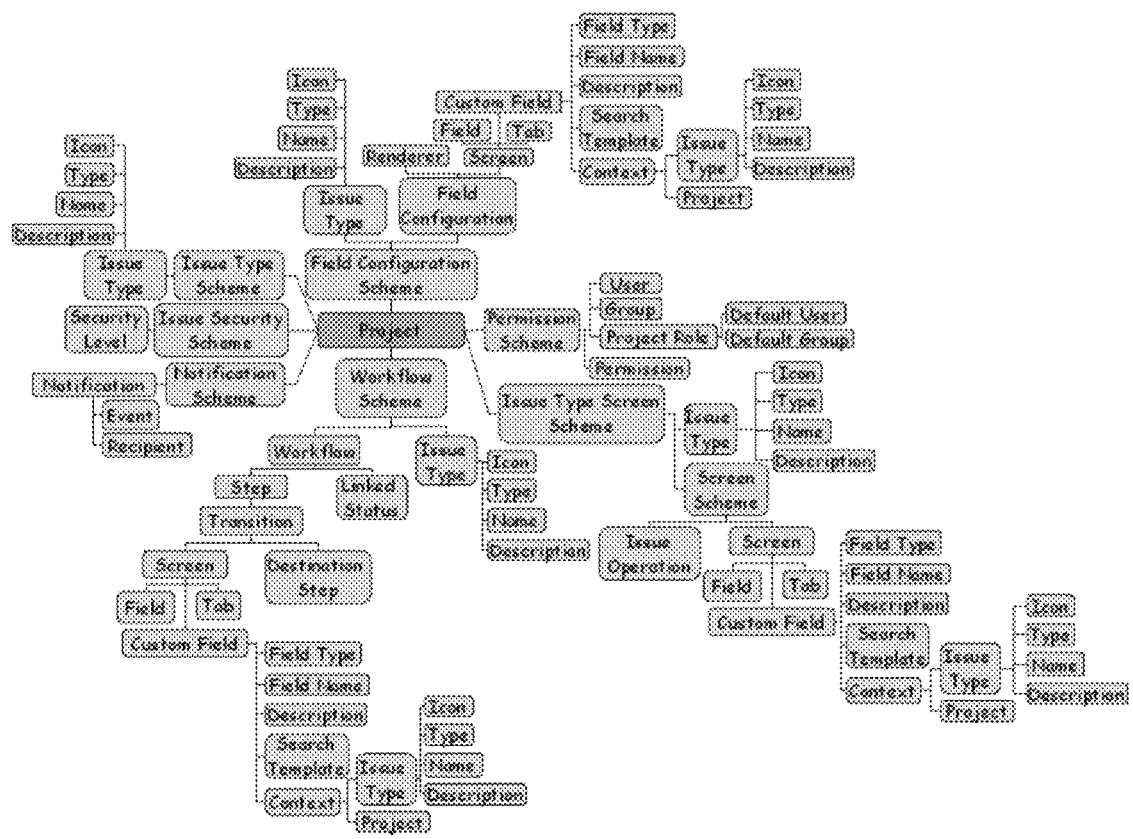
FIG. 3 is a block schematic diagram that shows an entity relations map.

Accordingly, an embodiment of the invention provides heuristics that make the import of the workflow into the destination system as automatic as possible. In embodiments of the invention, the workflow is processed on the target instance. A marketplace stores a canonical form of the workflow which does not require knowledge of the source or target. A workflow is composed of a specific set of elements. For example, a workflow has statuses and it has transitions. With each transition there are a set of things that can fire, such as conditions, validators, and post functions. There are attributes on each step. Thus, one can decompose a workflow and say, for example: "A workflow is always composed of the following X elements, and you can get from Status A to B by this transition, you can get from B to A through these possible three transitions." Accordingly, key to the invention is the notion of a canonical definition of a workflow that is decomposed into smaller elements, such that a workflow consists of a set of items. FIG. 2 is a block schematic diagram that shows the relationships between various entities and schemes within a workflow; and FIG. 3 is a block schematic diagram that shows an entity relations map. The workflow connects to all of those data types, i.e. fields, screens, issue types, etc. In the current implementation, the fields, screens, and statuses are pulled out. For purposes of the discussion herein, the simple version of workflow export that is inferior to workflow sharing stores the IDs of the status, screens, etc., but a target system knows nothing about those IDs. It is necessary to extract the metadata of the screen which contains a set of fields in a specified order. One cannot simply say "screen #4" because that means nothing, or it may mean something else, in the target system.

An embodiment of the invention provides heuristics that address conflicts when a workflow is imported to a new instance. For example, a workflow may have an element that already exists in the target system. In such case, the heuristics can create a copy of that element and give it a different name, or the heuristics can try to use that element as part of the workflow that is imported. In embodiments of the invention, there are different approaches, depending on the type of element that is overlapping. In other cases, there may be an element in the target that performs a function, but there is no way to implement such element in the workflow. That element, nonetheless, must be taken into consideration if the workflow is to be executed properly by the target.

For these and other issues, the invention provides a common definition for all of the different transitions and states and variables, where exceptions from one instance to another are addressed by the heuristics. In embodiments of the invention, everything is reduced to text. There are three files in the current workflow bundle: one that details the layout of the workflow diagram in JSON format, one that describes the workflow and its status in XML format, and one that describes the screens for the workflow in JSON format. There is also one file that provides notes about the plugin, but that is purely descriptive. Any IDs used in the workflow bundle must either be defined elsewhere in the workflow bundle or must be defined in core of the issue tracking system. One aspect of the uniqueness of the invention is the ability that it provides to cope with the fact that, while there is a canonical description of a workflow, the workflow is an extensive construct. The invention provides the ability to describe a workflow in a way that supports that extensibility and then copes with that extensibility on an instance-by-instance basis. The variety of attributes, plugin points, and elements of a workflow are discussed below. It can be seen that the underpinnings of all the elements of the workflow are what make it complex.

In an embodiment of the invention, a parser builds a tree representation of a workflow. The parser comprises a serializer/deserializer that takes an in-memory graph of the workflow and converts it into a textual format that can then be deserialized into the set of steps and transitions that an issue goes through during its lifecycle. To understand this aspect of the invention, it is helpful to understand the structure of a workflow, for example in an instance of a project management system.

Figure 4:
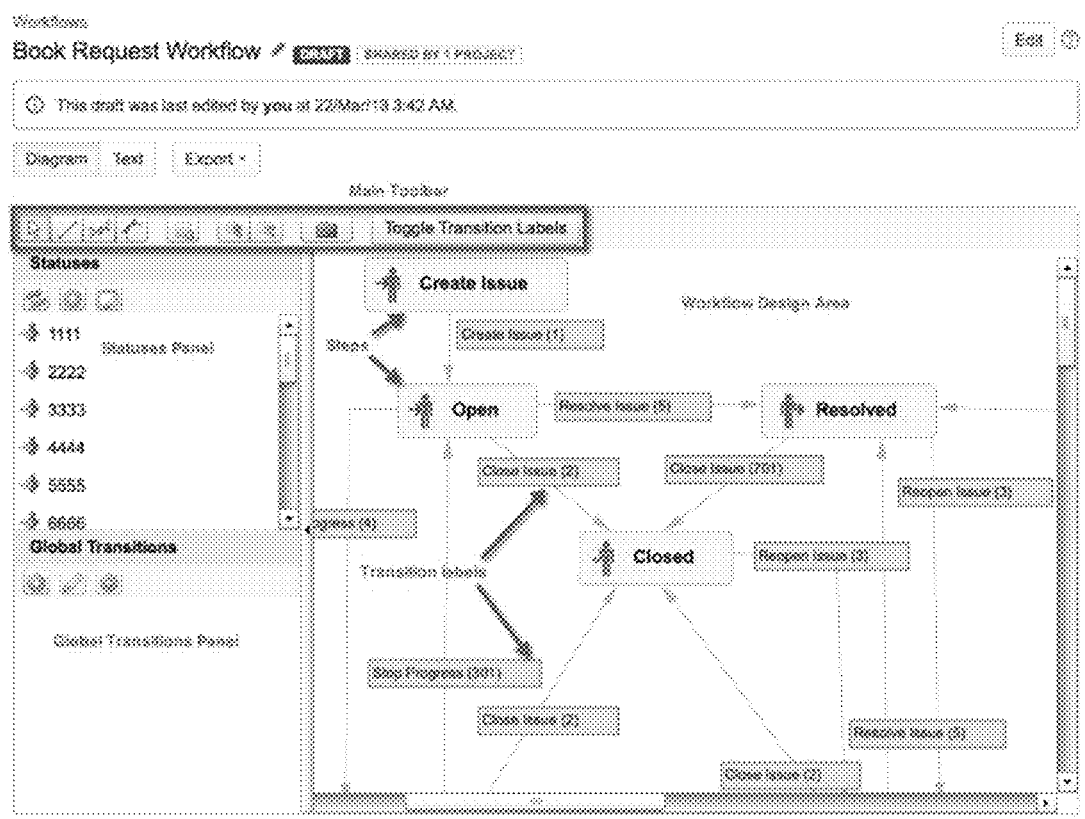
FIG. 4 is a flow diagram that illustrates a workflow, showing steps and transitions.

FIG. 4 is a flow diagram that illustrates a workflow, showing steps and transitions. As discussed above, workflows typically represent business processes. Each workflow can be associated with particular projects and, optionally specific issue types, by using a workflow scheme. The following discussion highlights some of the considerations that must be taken into account when sharing a workflow.

Considerations taken into account when editing a workflow are instructive in understanding the issues encountered when sharing a workflow. Editing a workflow involves modifying the steps and transitions that make up a workflow. There are slight differences between editing an inactive and an active workflow. Restrictions are placed on the modifications can be made to an active workflow, due to the impact the changes have on projects and/or issue types to which the workflow is applied. An inactive workflow is a workflow that is not currently being used by any projects. Because there are no issues currently transitioning through an inactive workflow, one can simply edit the workflow's steps and transitions. An active workflow is a workflow that is currently being used by one or more projects. When an active workflow is edited, the project management system first creates a draft of it. One can then modify the draft as desired. Once modification of the draft workflow is complete, the draft can be published. The draft workflow can also be shared in accordance with the invention herein.

Typically, there is special logic to deal with active workflows. An issue tracking system and, in particular JIRA, is able to migrate or bulk change a set of issues to reflect changes made in the workflow once the draft workflow is published. The following is an example of the special logic to deal with active workflows in a particular case:

Workflow steps cannot be deleted.

A step's associated status cannot be edited.

If a step has no outgoing transitions, it cannot have any new outgoing transitions added.

A step's Step 1D cannot be changed.

It is typically necessary to copy a workflow, modify the copy, and then activate it to make any of the modifications listed above.

As shown in FIG. 4, in a project management system workflows consist of steps and transitions. A step represents a workflow's current status for an issue. An issue can exist in one step only at any point in time.

Each workflow step corresponds to a linked status. When an issue is moved into a particular step, its status field is updated to the value of the step's linked status. When defining a step, one can optionally specify properties, one of which allows an issue to be made uneditable while it is in that step. Although steps and statuses are treated separately when administering workflows, they are effectively synonymous concepts and, as such, it usually helps to name a step after its linked status.

A transition is a link between two steps. A transition allows an issue to move from one step to another step. For an issue to be able to progress from one particular step to another, a transition must exist that links those two steps. A transition is a one-way link, so if an issue needs to move back and forth between two steps, two transitions need to be created. In FIG. 4, the arrows represent transitions. The available workflow transitions for an issue are listed on the issue's view issue page. A user can execute a transition, i.e. move the issue through workflow, by clicking one of the available links When defining a transition, one can optionally specify:

A screen to be displayed to the user, which is useful if it is necessary for the user to provide input before completing the transition.

Conditions which control who can perform a transition, i.e. who can see the transition link on the view issue page.

Validators that check that any user-supplied input is valid before performing the transition.

Post functions that perform particular actions after the transition is complete, e.g. assign the issue to a particular user, send an email notification, and/or update a field in the issue.

In a project management system, an issue is determined to be Open or Closed based on the value of its Resolution field, and not its Status field. An issue is determined to be Open if its Resolution field has not been set. An issue is determined to be Closed if its Resolution field has a value, e.g. Fixed, Cannot Reproduce. This is true regardless of the current value of the issue's Status field, i.e. Open, In Progress, etc. Therefore, if it is required for a workflow to force an issue to be Open or Closed, it is necessary to set the issue's Resolution field during a transition by either setting the Resolution field automatically via a post function or prompting the user to choose a Resolution via a screen. By way of distinction, in the case of JIRA an issue is determined to be Resolved based on its resolution field, not the status of the issue. In the default workflow in JIRA, an issue is resolved when it gets to a certain status. Open and Closed are merely statuses in the default workflow, while Resolution has a separate meaning. It is important to note for purposes of the discussion herein that Resolution is independent of Status, but resolution can be set by transitions. Further, setting the resolution can be performed automatically via certain transitions, e.g. if there is a transition called "close as duplicate" then the resolution would automatically be set on the to "duplicate" as well as changing the status to "closed." A human operator may also choose a resolution via the screen presented during the transition.

In a workflow, conditions control who can perform a transition and the circumstances under which they can perform the transitions, such as their project permissions, the status of any sub-tasks, or the state of source code associated with issues. If any part of a transition's condition fails, the user can not see the transition link on the view issue page.

Validators check that any input made to the transition is valid before the transition is performed. For example, validators can be used to ensure that comments on a transition's screen meet a certain project permission criterion. If a transition's validator fails, the transition's post functions are not executed. When this happens the issue does not progress to the destination step of the transition. Project management systems typically include default validators that check whether or not the user who performed a transition had the necessary project permission, which can be added immediately to any transition.

Validators differ from conditions. Conditions are used to determine whether an issue's transition can be executed by a particular user, including a range of other circumstances, such as the user's project permissions and the current state of the issue. However, conditions cannot validate input parameters provided by the user on the transition's screen because, if a condition fails, the user is prevented from executing the transition. Validators have access to any input available to the transition, such as inputs gathered from the user on a transition's screen, and thus, can validate this input.

Post functions are provided to carry out any additional processing required immediately after a transition is executed, such as:

Updating an issue's fields;

Generating change history for an issue;

Adding a comment to an issue; and

Generating an event such as an email notification.

There are typically two categories of post functions in a project management system, i.e. essential and optional.

One can construct complex conditions by combining two or more individual conditions using AND/OR Boolean logic to form a grouped condition. For example, one can construct the following simple grouped condition:

Only the assignee of this issue can execute this transition

AND

Only users in group users can execute this transition

This grouped condition is only true if the user is the assignee of the issue AND the same user is in the users group.

An overall complex condition can be constructed for a transition by combining multiple grouped conditions using AND/OR Boolean logic or nesting grouped conditions. A transition with a complex condition can only be executed if all individual and grouped conditions have been satisfied. This procedure can be used to create grouped conditions out of individual conditions that are already part of another grouped condition. This allows one to nest grouped conditions.

Workflow Sharing Architecture

Figure 5:
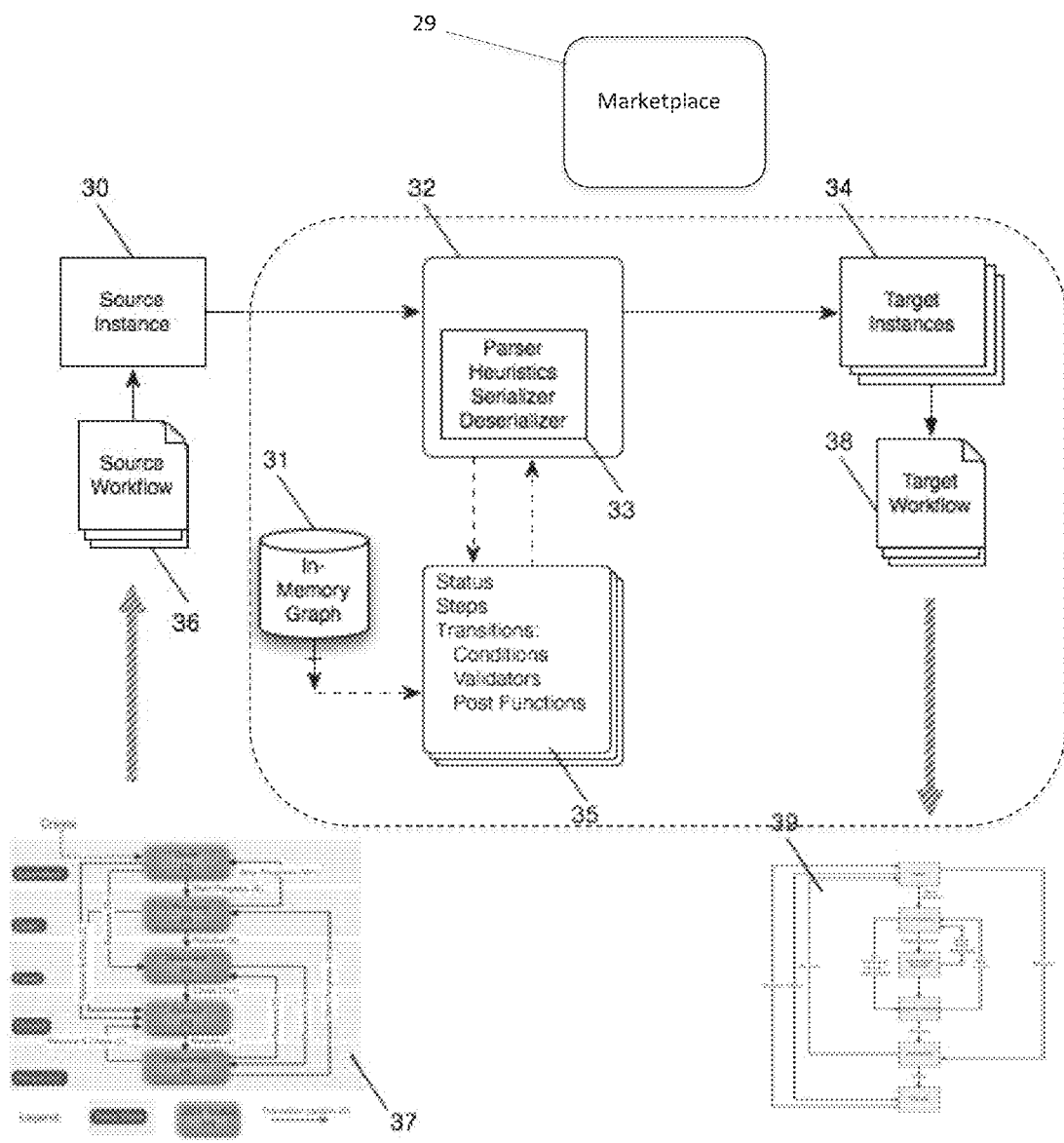
FIG. 5 is a block schematic diagram showing a workflow sharing architecture according to the invention.

FIG. 5 is a block schematic diagram showing a workflow sharing architecture according to the invention. As discussed above, workflow sharing creates a canonical description of a workflow.

In a presently preferred embodiment of the invention, a source workflow 36, 37 is created or otherwise resides at a source instance 30. In an embodiment of the invention, a .zip file of the source workflow is uploaded to a marketplace 29. The workflow is automatically converted to a marketplace version by the source host into the canonical format. The .zip file created by the source host is the same that is hosted on the marketplace. The conversion mechanism 32 in each target instance includes heuristics 33 in which a parser builds a tree representation of a workflow in connection with a serializer/deserializer that takes an in-memory graph 31 of the workflow and converts it into a textual format 35 that can then be deserialized into the set of steps and transitions that an issue goes through during its lifecycle. This mechanism allows individuals to import workflow bundles, i.e. workflows and the configuration that they depend on, including screens, custom fields, and plugins, between their instances, e.g. from staging to production. It also allows individuals at target instances to browse workflow bundles that other users have uploaded to a workflow marketplace. As discussed above, project tracking systems in accordance with the invention provide the ability to choose a given workflow bundle 38, 39 and download it to an local instance 34 of the project management system.

Such systems are very flexible and plugin developers can store their plugin data anywhere. This means that one cannot be certain that all of the configuration information that a workflow depends on for a target instance is included in the shared workflow. For instance, a plugin may store its data in a certain location, but the workflow parser herein does not know this when it looks at that workflow. It can only see that the workflow has a post function that stores an ID. The implication of this is that when the workflow bundle is imported to another project management instance, the post function either fails because the ID of the workflow element does not exist, or because it uses a random element that just happens to have the same ID.

For this reason, approaches to importing a workflow could include:

Only satisfy the second point above, i.e. by allowing only approved bundles to be downloaded from the marketplace;
Satisfy both points above, but without third-party plugin functionality; or
Pull in everything, including plugins and plugin data by giving plugins a plugin point to export and import data.

If option (1) above is chosen, an entire use case of functionality is taken away from the shared workflow, i.e. the ability to upload bundles directly from the user's computer. Furthermore, it would still be a struggle to ensure that all bundles that had been uploaded to the marketplace were compatible for target instances, that the workflow inside of them did not do anything malicious, and that they actually worked on the user's instance. Thus, a presently preferred embodiment of the invention implements option (2) above, where users are given as much information as possible about the plugin functionality that is removed when the workflow is processed for sharing, which enables both use cases above. Option (3) above is also of merit and is within the scope of the invention.

In an embodiment of the invention workflow sharing is implemented, for example, by bundling the workflow, but removing any plugins from the workflow on export. At the end of this step, users can browse, download, and install workflow bundles from the marketplace, as well as import their own bundles. Users are provided with a list of steps that give them as much detail as possible about the plugins that were removed, where they were removed from (the transition), what they were removed from (the post-function, condition, or validator), and what was removed (custom field, etc.).

If a workflow is to be shared with another instance of the project management system or to be uploaded to the marketplace, it must first be downloaded. As part of this process, a notes field may be used to add any special configuration notes; for example, information about plugins that should be installed. The invention auto-populates these notes when it discards parts of the workflow, for example, plugins, post functions, conditions, and validators. The workflow export machine goes through each transition in the workflow and collects the plugins that provide the post functions, conditions, and validators that appear on a given transition. It then determines which of those plugins can be relied upon to exist in a given target instance. For those plugins that are not certain to exist, the corresponding post functions, conditions, and validators are moved from the exported workflow. The notes that are auto generated first list of all the plugins that are part of the source workflow, but that have been removed from the exported workflow. Then, within these notes, details are provided on exactly what was removed from each transition. The type of the removed config item is listed, e.g. post function, condition, or validator, followed by the plugin that provided this item.

Figure 6:
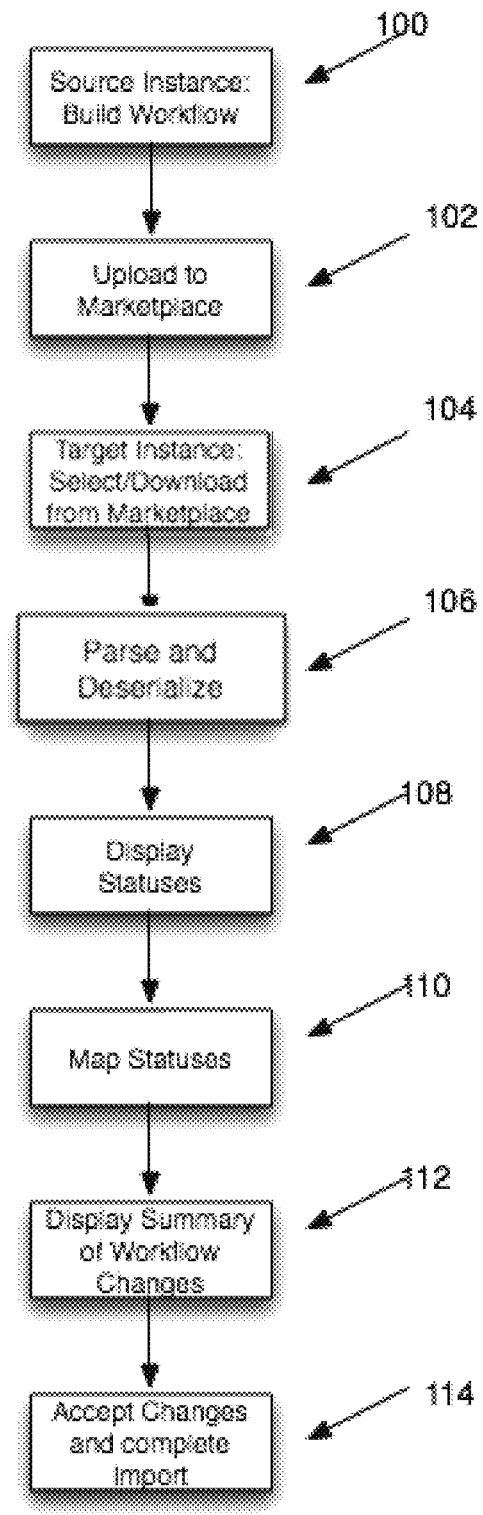
FIG. 6 is a flow diagram showing workflow sharing according to the invention.
Figure 7:
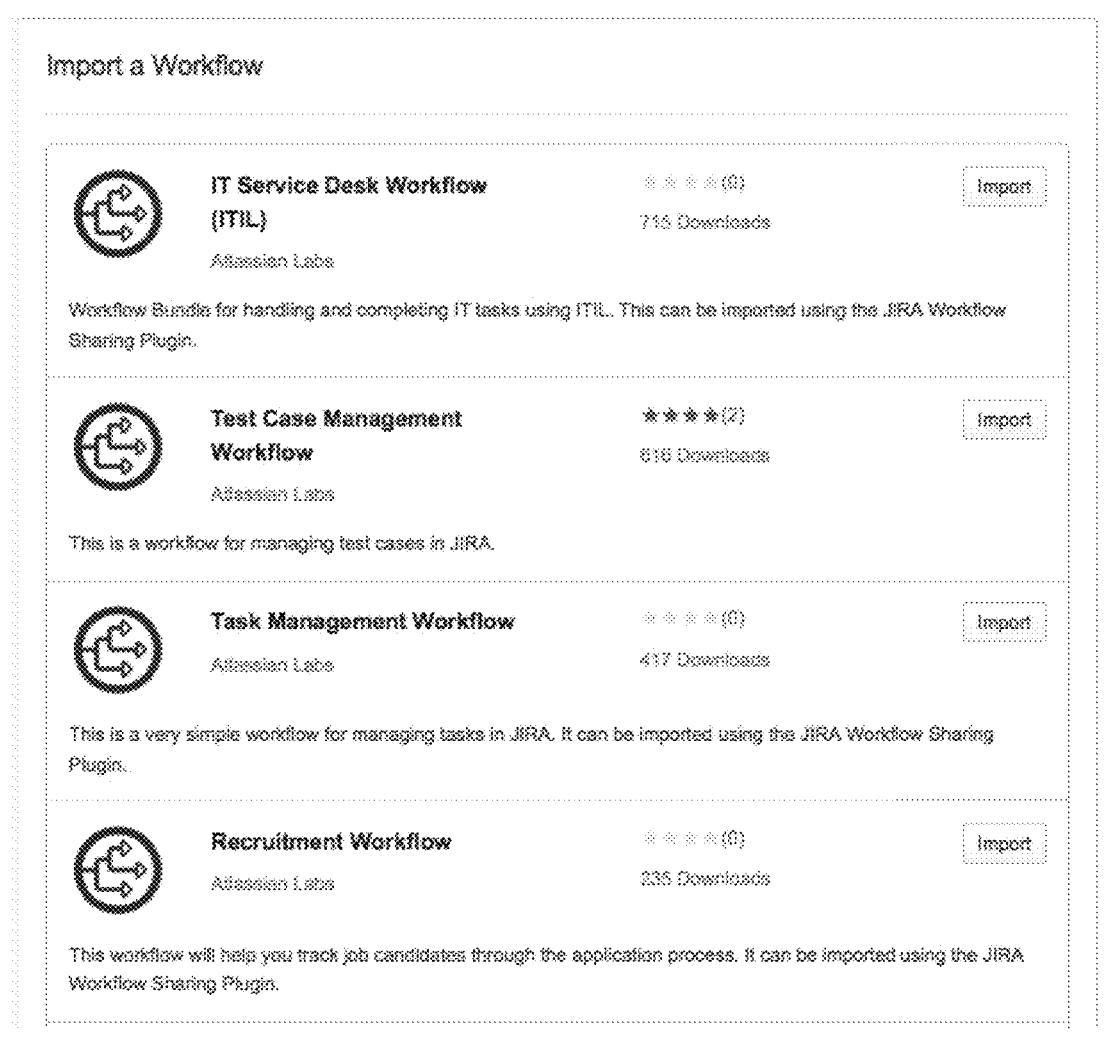

FIG. 6 is a flow diagram showing workflow sharing according to the invention. A workflow is built at a source instance (100) and exported, removing workflow customizations that are not guaranteed to be available at a given target instance. The workflow is uploaded to the marketplace (102). The user browses the market place via a UPM on the target instance to select a workflow to install and downloads the workflow. Importing a workflow from the marketplace or from a local instance involves selecting a workflow (104) to upload (see FIG. 7). At the target instance, the workflow is parsed and deserialized (106) as discussed above in connection with FIG. 5. The invention automatically generates a workflow name, but it be can changed if desired. Next, the user is presented with a screen that details workflow statuses (108), as shown in FIG. 8. The user can map the steps of the workflow to existing workflow statuses (110) or create new statuses at this point. When finished, the user is presented with a screen that presents a summary of the workflow changes (112), as shown in FIG. 9. Once the user accepts these changes the workflow is imported (114).

Figure 10:
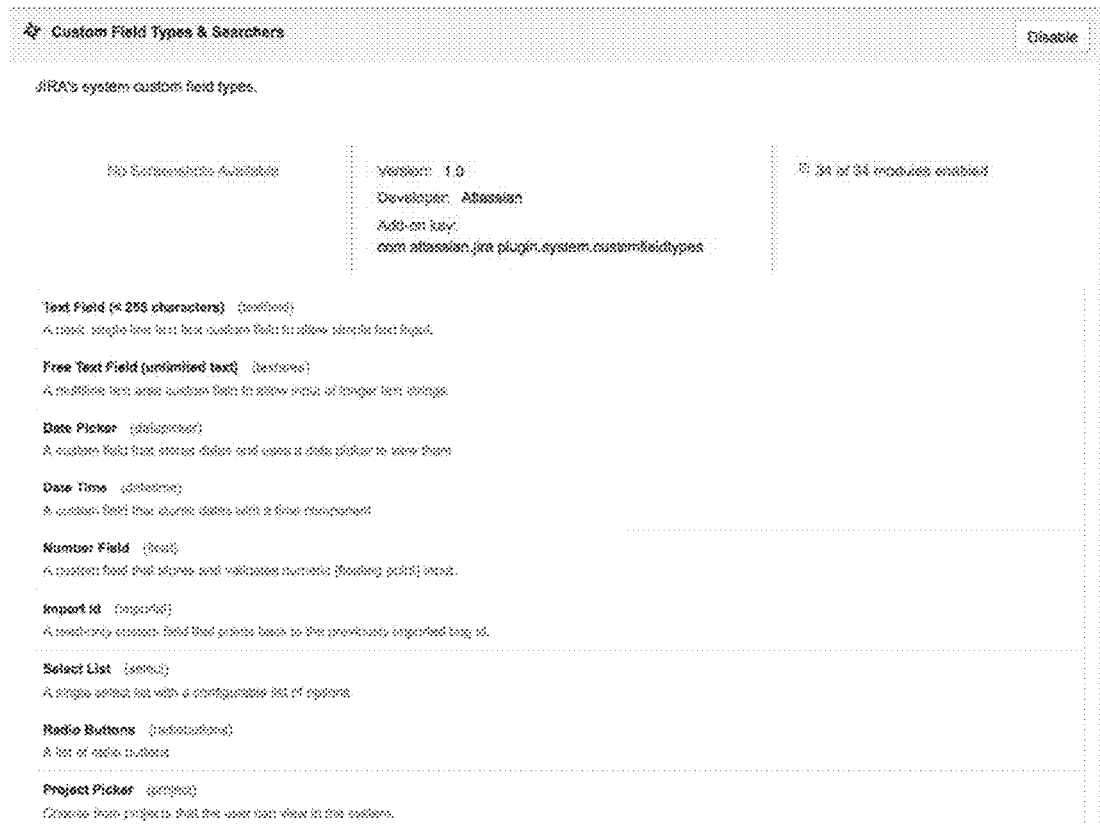
FIG. 10 is a screen shot that shows custom field types and searchers according to the invention.

If the workflow that is being imported contains custom fields that are disabled, the workflow importer does not create these fields unless they are enabled before importing. The user receives a warning about this. To fix this, the user must enable the missing custom fields before proceeding with the import (see FIG. 10).

Computer Implementation

Figure 11:
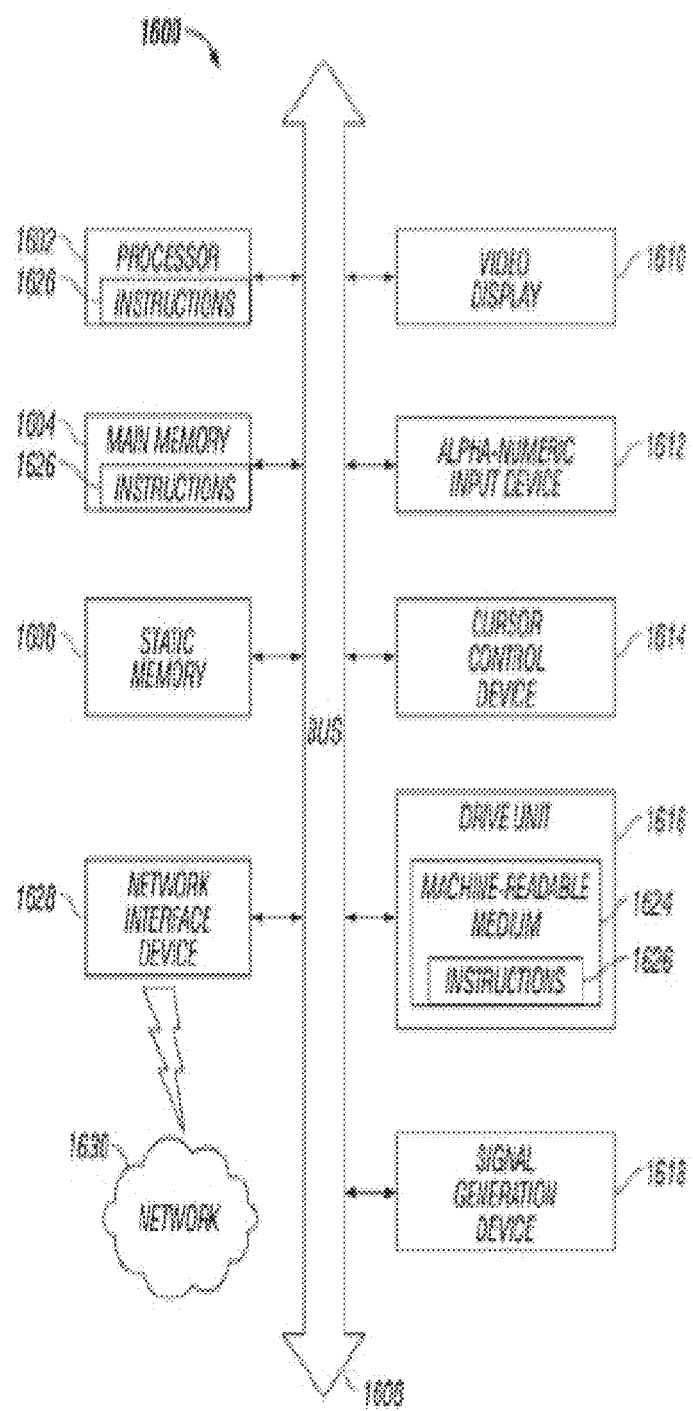
FIG. 11 is a block schematic diagram that depicts a machine in the exemplary form of a computer system within which a set of instructions for causing the machine to perform any of the herein disclosed methodologies may be executed.

FIG. 11 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention.

For example, the source workflow may be processed for use by the target instance by the target instance rather than at the marketplace.

Accordingly, the invention should only be limited by the Claims included below.

The invention claimed is:
1. A computer system comprising:
 a source workflow management computer comprising:
  first one or more processors;
  first one or more non-transitory computer-readable storage mediums storing first one or more instructions which, when executed by the first one or more processors, cause the first one or more processors to:
   determine one or more plugins upon which a workflow relies, wherein the workflow comprises a set of steps and a set of transitions between steps within the set of steps;
   wherein each transition of the set of transitions includes one or more of: one or more conditions which control when the transition can be performed, one or more validators which check one or more user inputs for validity, or one or more post-functions that perform one or more actions after the transition has completed;
   determine a particular plugin of the one or more plugins is not certain to exist on a target workflow management computer;
   remove, from the set of transitions, any conditions, validators, or post-functions associated with the particular plugin to generate exportable transitions;
   convert the set of steps and the exportable transitions into a description of the workflow, wherein the description identifies one or more plugins upon which the workflow relies, but does not include the one or more plugins, and wherein the description identifies removed conditions, validators, or post-functions;
   send the description to a marketplace server that hosts a collection of descriptions of workflows;
 wherein the marketplace server comprises:
  second one or more processors;
  second one or more non-transitory computer-readable storage mediums storing second one or more instructions which, when executed by the second one or more processors, cause the second one or more processors to:
   store the description of the workflow in the collection of descriptions;
   receive a request from the target workflow management computer for the description of the workflow;
   send the description of the workflow to the target workflow management computer;
 wherein the target workflow management computer comprises:
  third one or more processors;
  third one or more non-transitory computer-readable storage mediums storing third one or more instructions which, when executed by the third one or more processors, cause the third one or more processors to:
   receive the description of the workflow from the marketplace server;
   convert the description into the set of steps and the exportable transitions;
   identify from the description the one or more plugins upon which the workflow relies and any removed conditions, validators, or post-functions;
   provide information that identifies the one or more plugins.

2. The system of claim 1, wherein the one or more post-functions rely on the one or more plugins.

3. The system of claim 1, wherein the first one or more instructions further cause the first one or more processors to identify the one or more plugins upon which the workflow relies by analyzing each transition of the workflow and determining a set of plugins that the transition uses.

4. The system of claim 1, wherein the third one or more instructions further cause the third one or more processors to:
   display a user interface, based on the description, that includes a current mapping of one or more status identifiers to the set of steps and an option for remapping the set of steps to other status identifiers;
   receive, via the user interface, user input indicating a new status identifier to map to a step of the set of steps and in response changing the current mapping to map the step to the new status identifier.

5. The system of claim 4, wherein the third one or more instructions further cause the third one or more processors to display in a user interface information for one or more custom fields that will be created by the workflow.

6. The system of claim 5, wherein the information for the one or more custom fields includes one or more of: one or more names, one or more descriptions, or one or more types.

7. The system of claim 1, wherein the third one or more instructions further cause the third one or more processors to identify an element utilized by the workflow that already exists within the target workflow management computer, copy the element, and give the element a new name.

8. The system of claim 1, wherein the third one or more instructions further cause the third one or more processors to identify an element utilized by the workflow that already exists within the target workflow management computer and cause the workflow to utilize the element that already exists within the target workflow management computer.

9. A method comprising:
   a source workflow management computer determining one or more plugins upon which a workflow relies, wherein the workflow comprises a set of steps and a set of transitions between steps within the set of steps;
   wherein each transition of the set of transitions includes one or more of: one or more conditions which control when the transition can be performed, one or more validators which check one or more user inputs for validity, or one or more post-functions that perform one or more actions after the transition has completed;
   the source workflow management computer determining a particular plugin of the one or more plugins is not certain to exist on a target workflow management computer;
   the source workflow management computer removing, from the set of transitions, any conditions, validators, or post-functions associated with the particular plugin to generate exportable transitions;
   the source workflow management computer converting the set of steps and the exportable transitions into a description of the workflow, wherein the description identifies one or more plugins upon which the workflow relies, but does not include the one or more plugins, and wherein the description identifies removed conditions, validators, or post-functions;
   the source workflow management computer sending the description to a marketplace server that hosts a collection of descriptions of workflows;
   the marketplace server storing the description of the workflow in the collection of descriptions;
   the marketplace server receiving a request from the target workflow management computer for the description of the workflow;
   the marketplace server sending the description of the workflow to the target workflow management computer;
   the target workflow management computer receiving the description of the workflow from the marketplace server;
   the target workflow management computer converting the description into the set of steps and the exportable transitions;
   the target workflow management computer identifying from the description the one or more plugins upon which the workflow relies and any removed conditions, validators, or post-functions;
   the target workflow management computer providing information that identifies the one or more plugins.

10. The method of claim 9, wherein the one or more post-functions rely on the one or more plugins.

11. The method of claim 9, further comprising the source workflow management computer identifying the one or more plugins upon which the workflow relies by analyzing each transition of the workflow and determining a set of plugins that the transition uses.

12. The method of claim 9, further comprising:
    the target workflow management computer displaying a user interface, based on the description, that includes a current mapping of one or more status identifiers to the set of steps and an option for remapping the set of steps to other status identifiers;
    the target workflow management computer receiving, via the user interface, user input indicating a new status identifier to map to a step of the set of steps and in response changing the current mapping to map the step to the new status identifier.

13. The method of claim 12, further comprising the target workflow management computer displaying in a user interface information for one or more custom fields that will be created by the workflow.

14. The method of claim 13, wherein the information for the one or more custom fields includes one or more of: one or more names, one or more descriptions, or one or more types.

15. The method of claim 9, further comprising, the target workflow management computer identifying an element utilized by the workflow that already exists within the target workflow management computer, copy the element, and give the element a new name.

16. The method of claim 9, further comprising, the target workflow management computer identifying an element utilized by the workflow that already exists within the target workflow management computer and cause the workflow to utilize the element that already exists within the target workflow management computer.

* * * * *